US012679166B2

(12) United States Patent (10) Patent No.: US 12,679,166 B2
Konieczny et al. (45) Date of Patent: Jul. 14, 2026

(54) TEMPERATURE CONTROL SYSTEM FOR A MOTOR VEHICLE CONTROLLING THE TEMPERATURE OF DRIVETRAIN COMPONENTS OF A MOTOR VEHICLE

(71) Applicant: Ford Global Technologies, LLC, Dearborn, MI (US)

(72) Inventors: Thomas Konieczny, Witten (DE); Fabian Kueppers, Hürth (DE); Jan Mehring, Cologne (DE); Hans Guenter Quix, Herzogenrath (DE); Tobias Emig, Gelsenkirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 18/430,271

(22) Filed: Feb. 1, 2024

(65) Prior Publication Data

US 2024/0270043 A1     Aug. 15, 2024

(30) Foreign Application Priority Data

Feb. 10, 2023    (DE) .......................... 102023103254.2

(51) Int. Cl.
B60H 1/00 (2006.01)
B60K 11/04 (2006.01)
(52) U.S. Cl.
CPC ..... B60H 1/00021 (2013.01); B60H 1/00385 (2013.01); *B60H 2001/00092* (2013.01); *B60H*
*2001/00178* (2013.01); *B60H 2001/003* (2013.01); *B60K 11/04* (2013.01)
(58) Field of Classification Search
CPC ............ B60H 1/00021; B60H 1/00385; B60H 2001/00092; B60H 2001/003; B60H 2001/00178; B60H 2001/00271; B60H 2001/00278; B60K 11/04
See application file for complete search history.

(56) References Cited

U.S. PATENT DOCUMENTS

| | | | |
|---|---|---|---|
| 7,478,670 B2 | 1/2009 | Richter et al. | |
| 8,119,300 B2 | 2/2012 | Tsuchiya et al. | |
| 11,274,595 B1 | 3/2022 | Farhat et al. | |
| 11,505,029 B2 * | 11/2022 | You .................... | B60H 1/00899 |
| 11,525,611 B2 * | 12/2022 | Sugimura ......... | H01M 10/6567 |
| 11,718,142 B2 * | 8/2023 | Pecchia ................ | B60H 3/0078 165/42 |
| 2007/0022772 A1 * | 2/2007 | Zhu ................... | H01M 10/6556 62/239 |
| 2023/0040086 A1 * | 2/2023 | Park ................... | B60H 1/00842 |

FOREIGN PATENT DOCUMENTS

| | | |
|---|---|---|
| CN | 114729790 A | 7/2022 |
| DE | 102005021413 A1 | 5/2006 |
| WO | 2014012897 A2 | 1/2014 |

* cited by examiner

*Primary Examiner* — Joel M Attey
(74) *Attorney, Agent, or Firm* — McCoy Russell LLP

(57) ABSTRACT

Methods and systems are provided for a temperature control system of a vehicle In one example, a system includes an evaporator directly upstream of a heat exchanger and a plurality of valves configured to adjust flow of air passing through one or more of the evaporator and the heat exchanger.

8 Claims, 6 Drawing Sheets

| Operating mode | shown in | Description | First flap (5) | Second flap (6) | Third flap (7) | Evaporator | Cooling of the air (4) to be fed into the vehicle interior (12) | Additional drivetrain cooling |
|---|---|---|---|---|---|---|---|---|
| #1 | Fig.2 | Interior heating | closed | open | closed | off | 0 | low/medium * |
| #2 | Fig.3 | Interior heating & dehumidification | closed | open | closed | on | low/medium (dehumidification on) | low/medium * |
| #3 | Fig.4 | Interior cooling | open | closed | closed | on | medium/high | 0 |
| #4 | Fig.5 | Additional drivetrain cooling without interior cooling | closed | open | open | on | 0 | high |
| #5 | Fig.6 | Additional drivetrain cooling without interior cooling | closed | open | open | off | 0 | medium |
| #6 | Fig.7 | Additional drivetrain cooling with interior cooling | partially open | partially open | open | on | medium | medium |

Figure 9

TEMPERATURE CONTROL SYSTEM FOR A MOTOR VEHICLE CONTROLLING THE TEMPERATURE OF DRIVETRAIN COMPONENTS OF A MOTOR VEHICLE

CROSS REFERENCE TO RELATED APPLICATION

The present application claims priority to German Patent Application No. 102023103254.2 filed on Feb. 10, 2023. The entire contents of the above-listed application is hereby incorporated by reference for all purposes.

FIELD

The present description relates generally to a temperature control system for a motor vehicle, to a motor vehicle, to a method for controlling the temperature of drivetrain components of a motor vehicle, and to a method thereof.

BACKGROUND/SUMMARY

For many years, engineers have been trying to optimize the aerodynamics of modern vehicles in order to increase the overall energy efficiency of the vehicles. In order to reduce drag, it is helpful to reduce the area of the radiator grille. Behind the radiator grille there are heat exchangers which transfer heat to the ambient air flowing through the radiator grille. One of these heat exchangers is assigned to the cooling circuit of the drivetrain, enabling components of the drivetrain to be cooled.

Vehicles with modern and efficient internal combustion engines or fully electric vehicles may have a relatively low cooling requirement because there is relatively little waste heat. The area of the radiator grille can therefore be smaller, this being advantageous for an aerodynamically favorable shape. In comparison with a fully electric vehicle, the temperature of the waste heat from an internal combustion engine is much higher. As a result, the temperature of the coolant which flows into the heat exchanger is higher and leads to a greater temperature difference relative to the ambient air. In the case of some fully electric vehicles, the surface of the heat exchanger can be reduced because of the smaller amount of waste heat. However, this can lead to restrictions in a hot environment and/or a high load requirement.

In parallel with this, fuel cell technology is gaining in importance in the automotive industry. Although fuel cells generally have a higher efficiency than internal combustion engines, the energy component which has to be dissipated into the cooling system is higher owing to the relatively small amount of energy in the exhaust gas flow. Moreover, fuel cells generally require a lower coolant temperature than internal combustion engines, leading to a smaller temperature difference for heat transfer to the ambient air and hence reducing the efficiency of the heat exchanger. In this context, when using fuel cell technology to drive a vehicle, the dimensions of the cooling system tend to be larger than in the case of a comparable internal combustion engine. In order to be able to dissipate the waste heat and prevent overheating, the surface of the heat exchanger would be correspondingly enlarged. Owing to the structural and aerodynamic limitations introduced and the issues with placement on account of installation space restrictions, suitable adaptation of the heat exchanger design is demanded.

For example, EP 1 329 344 B1 discloses a cooling system for a vehicle fitted with a fuel cell, said system having a plurality of heat exchangers. One of the heat exchangers can be designed as a cooler for the fuel cell. Overall, the cooling system described is very complex, requires a large amount of installation space and is associated with more resources. Moreover, adequate cooling of the fuel cell cannot be ensured in all cases.

U.S. Pat. No. 8,119,300 B2 describes a temperature control system of a vehicle in which the heat generated by a fuel cell can be used to heat the vehicle interior. In this case, there can be excessive heating of the vehicle interior or inadequate cooling of the fuel cell.

DE 10 2005 021 413 A1 discloses a fuel cell system of a vehicle with a cooling system which has a cooling heat exchanger through which ambient air flows. Here, the ambient air can enter through inlet openings in the regions of the vehicle surface in which the flow lines are compressed on account of the displacement effect of the moving vehicle. In this case, the minimum temperature to which cooling can be achieved is that of the ambient air.

WO 2014/012 897 A2 discloses an air-conditioning system for vehicles which allows individual control of the temperature of an air flow from a foot well outlet. For this purpose, a cold air flow and a warm air flow are mixed together in a mixing space.

In addition, U.S. Pat. No. 7,478,670 B2 discloses a climate control system for a vehicle via which several zones in a vehicle interior can be subject to climate control.

In one example, the issues described above may be addressed by a temperature control system for a vehicle including a heat exchanger configured to transfer heat between a temperature control medium and air, an evaporator of a climate control system configured to condition the air, wherein the evaporator is arranged directly upstream of the heat exchanger relative, and a plurality of elements configured to control a flow path of the air, wherein a first flow path is configured to flow the air from a first environment to the evaporator, then directly to the heat exchanger prior to returning to the vehicle environment.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

3

Figure 7:
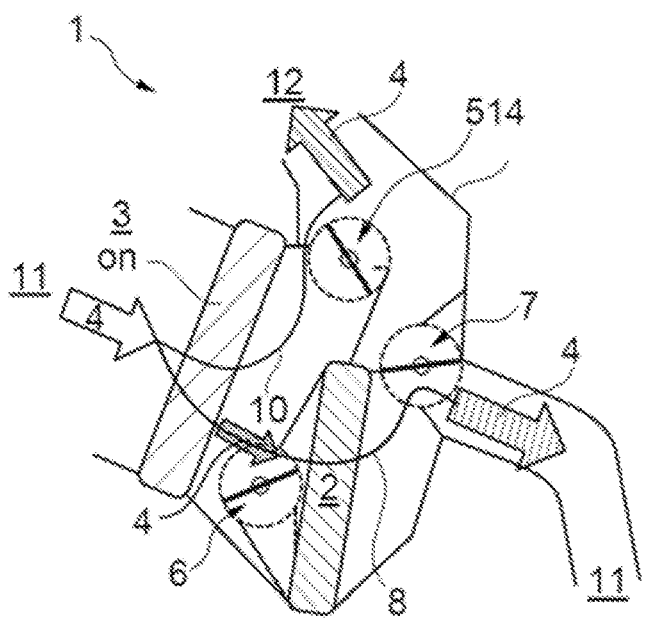
Figure 8:
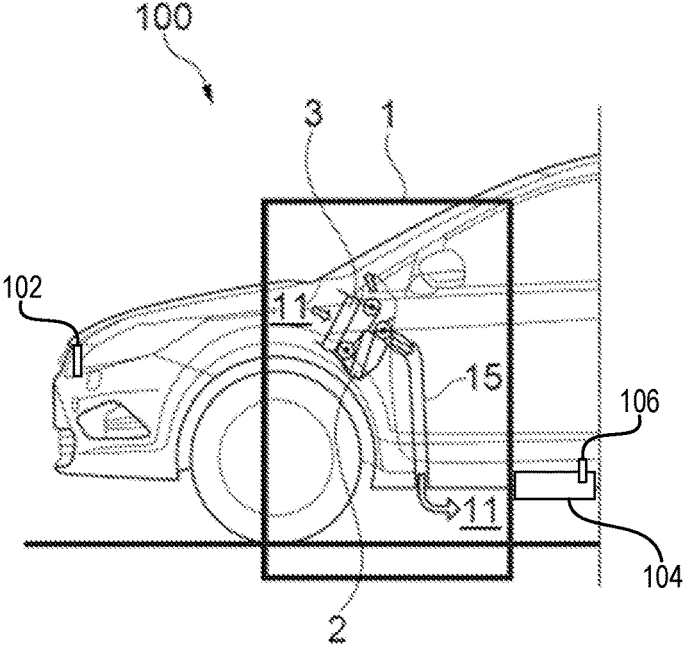
Figure 10:
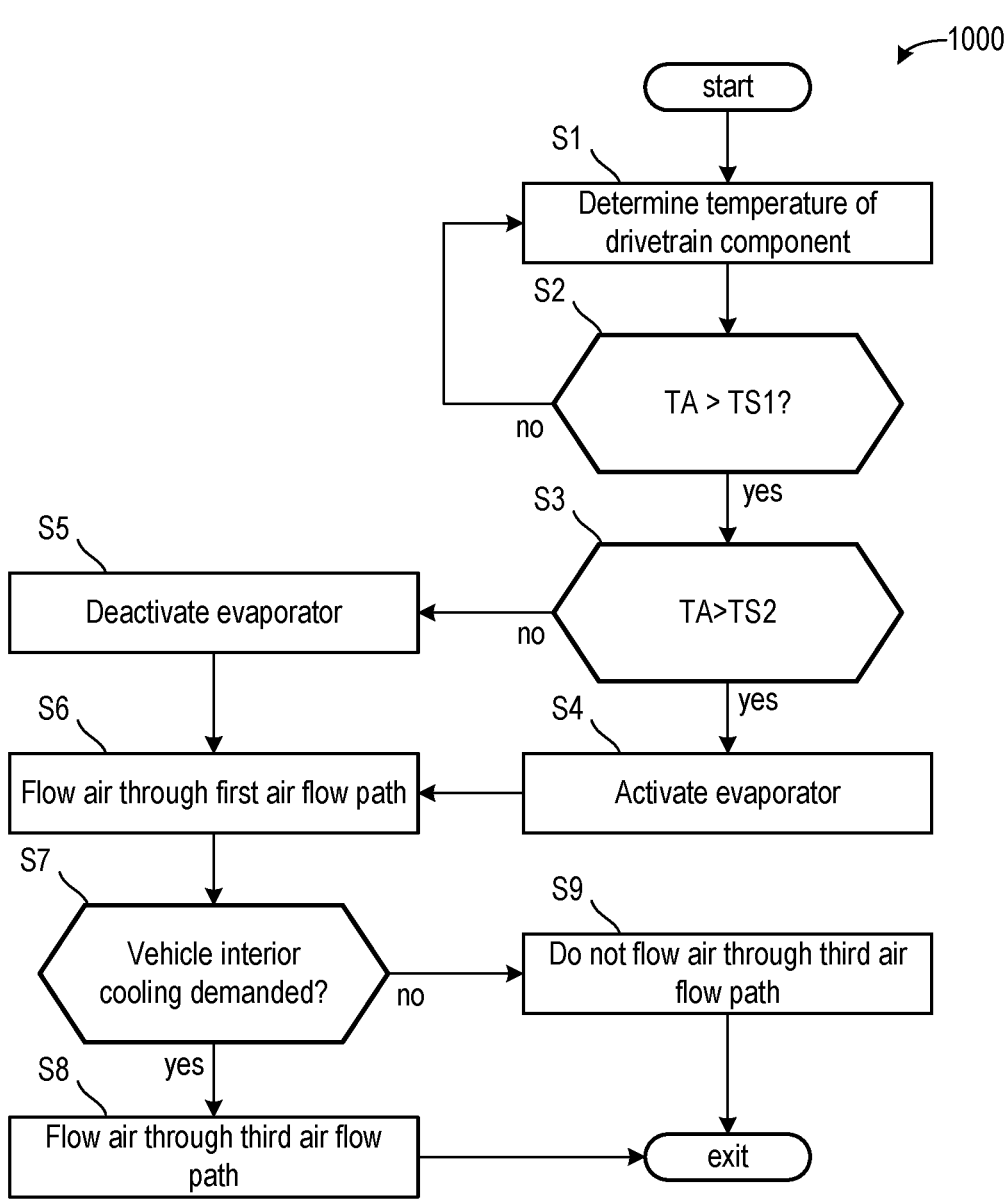

FIG. 7 illustrates the temperature control system in a sixth mode;

FIG. 8 illustrates a schematic diagram of a motor vehicle including the temperature control system;

FIG. 9 illustrates a table detailing the first through sixth modes of the temperature control system; and FIG. 10 illustrates a method for operating the temperature control system.

DETAILED DESCRIPTION

Figure 1:
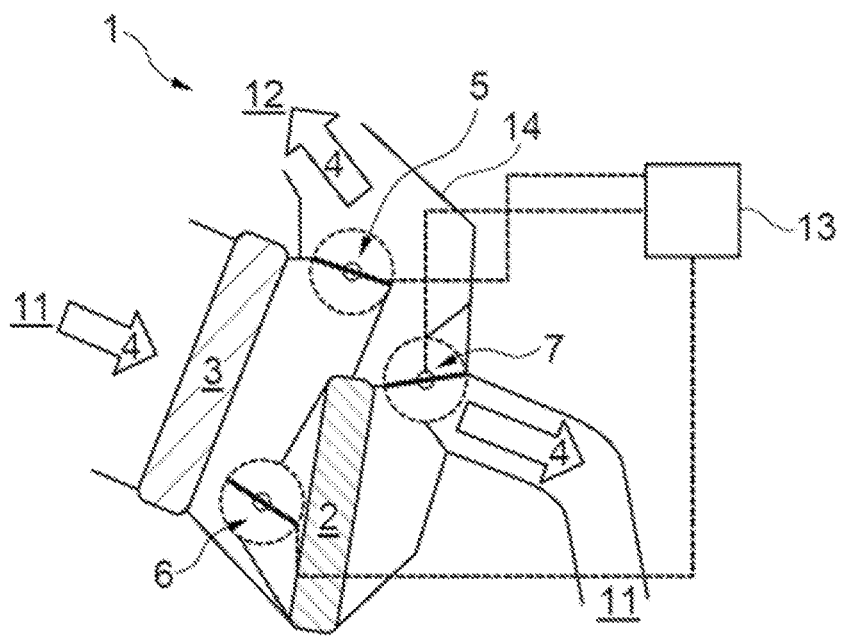
FIG. 1 illustrates a schematic diagram of a temperature control system.

The following description relates to systems and methods for a thermal management system. The thermal management system may be included in a vehicle, such as a vehicle shown in FIG. 8. The thermal management system is illustrated in FIG. 1. FIGS. 2-7 illustrate different operating modes of the thermal management system. FIG. 9 illustrates a table summarizing conditions of the different operating modes of the thermal management system. FIG. 10 illustrates a method for operating the thermal management system.

A motor vehicle should be understood to mean a vehicle that can be driven by a motor (engine), e.g. a land vehicle, aircraft or watercraft. The motor vehicle can be a passenger car, for example. The vehicle can be driven via an internal combustion engine, an electric motor or a combination of an internal combustion engine and an electric motor, for example. An internal combustion engine, also referred to in some cases as a combustion engine, is an internal combustion machine for converting chemical energy contained in the fuel into mechanical work. The internal combustion engine can be designed as a compression-ignition or applied-ignition internal combustion engine, for example. Gasoline, diesel or hydrogen can be used as a fuel, for example. The electrical energy required for driving via the electric motor can be made available from a battery storage device, wherein the battery storage device can be charged via energy recovery or externally by connection to a power source, for example. Alternatively or in addition, the electrical energy can be made available by the oxidation of hydrogen in a fuel cell.

The proposed temperature control system has a heat exchanger, which is configured to transfer heat between a temperature control medium, which flows in a temperature control circuit for controlling the temperature of drivetrain components of the vehicle, and air.

Drivetrain components should be understood to mean components of the motor vehicle which are used for driving, e.g. an internal combustion engine, fuel cell, or vehicle battery. Since the drivetrain components are functional only within a certain temperature range and/or efficient operation is possible only within a certain temperature range, the drivetrain components generally desire temperature control. Here, the extent of temperature control is dependent on various factors, e.g. engine load, ambient temperature, time since the starting of the motor vehicle, and among the aims of temperature control is that of maintaining the particular temperature range, the limits of which may be −20° C. and 70° C. for a fuel cell, for example.

The temperature control system can be used for cooling fuel cells as drive components, that is to say the temperature control circuit can be the circuit for temperature control, in particular cooling, of the fuel cell(s). As an option, the temperature control circuit of the fuel cell(s) can be connected to the temperature control circuit, e.g. heating circuit, for the vehicle interior as explained below.

To control the temperature of the drivetrain components, a temperature control medium, preferably water, optionally provided with additives, is used, which flows in a circuit and absorbs excess heat from the drivetrain components and transfers and thereby dissipates it to air in the heat exchanger. The temperature control circuit can be used to control the temperature of one or more drivetrain components. If a plurality of drivetrain components is cooled via the same temperature control circuit, the cooling requirement can preferably be based on those drivetrain components whose temperature range has the lowest maximum temperature. The temperature control circuit can also have a plurality of heat exchangers, e.g. a heat exchanger which is arranged as usual at the front of the vehicle in the region of the radiator grille.

Moreover, the temperature control system has an evaporator of a climate control system for conditioning the air. Climate control means that both the temperature and the humidity of the air can be adjusted. The climate control system can also be referred to as an air conditioning system and, as usual, has at least the following components: a compressor, a condenser, a dryer, an expansion valve and the evaporator. The components may be connected to one another by a refrigerant circuit, in which a refrigerant flows. The evaporator of the climate control system acts as a heat exchanger, in which latent heat of evaporation is released to the air surrounding the evaporator. For this purpose, the refrigerant flows into the evaporator, with its state of aggregation changing from liquid to gaseous, for which purpose heat from the surrounding air is used, as a result of which the air cools down. Together with the temperature, the dew point of the cooled air also falls, and therefore moisture contained in the air condenses and is precipitated. As a result, not only the temperature but also the humidity falls.

The evaporator is arranged upstream of the heat exchanger. The air first contacts the evaporator and then flows to the heat exchanger. The evaporator and the heat exchanger can preferably be arranged immediately, (e.g., directly), one behind the other when viewed in the flow direction of the air. In other words, provision can be made to ensure that no other components or volumes that might affect the temperature and/or humidity of the air are arranged between the evaporator and the heat exchanger, and therefore the air can flow directly from the evaporator to the heat exchanger, for example, without previously passing through the vehicle interior.

Moreover, the temperature control system has a plurality of elements for determining flow paths of the air. Examples elements may include shutoff elements such as flaps, slides, and valves. The term "flap(s)" is used representatively for flaps, slides and valves below for determining flow paths of the air. By suitable positioning, e.g. open position, closed position, half open position, of the flaps, it is possible to determine which flow path(s) the air takes and hence the components of the temperature control system with which the air can interact. In particular, it is possible to determine whether the air comes into contact with the heat exchanger, whether the air flows into the vehicle interior and/or whether the air flows into the vehicle environment. For details in this regard, the following explanations and the associated operating modes of the temperature control system are provided.

In the temperature control system proposed, a first air flow path can be determined in such a way that the air flows from a vehicle environment to the evaporator, then to the heat exchanger and subsequently into the vehicle environment.

In other words, ambient air can be used to cool the temperature control medium in the heat exchanger. After cooling the temperature control medium, the subsequently heated then heated air can be released into the environment. The first air flow path preferably leads directly from the heat exchanger into the vehicle environment, in particular without previously passing through the vehicle interior.

Before contact with the heat exchanger, the air can be cooled via the evaporator, thus ensuring that a greater temperature difference between the temperature control medium and the air is obtained at the heat exchanger, thereby enabling the cooling of the temperature control medium to take place more efficiently. For example, the temperature control medium can be cooled to a lower temperature, thus enabling the drivetrain component(s) to be cooled to be operated reliably, in particular within a specifiable temperature range, even when there is an increased cooling requirement, e.g. as a result of high ambient temperatures. As a result, there is the possibility of increasing the system limits of correspondingly equipped motor vehicles, in particular motor vehicles which use fuel cells for the drive, without the need for additional components and/or design changes to any great extent for this purpose. Moreover, the proposed temperature control system can contribute to the potential for using the same components for battery-operated electric vehicles and electric vehicles operated using fuel cells as part of a "common parts strategy".

Alternatively or in addition, it is possible on account of the larger temperature difference, to reduce the overall size of the heat exchanger, making possible adequate cooling of the drivetrain component(s) even when the installation space in the motor vehicle is limited.

Moreover, the proposed temperature control system makes it possible to reduce the drag of the motor vehicle and thus to reduce fuel or energy consumption since, as explained in the background, the area of the radiator grille can be reduced since the demanded cooling capacity can be available in some other way. In addition, it is thereby possible to increase the amount of freedom available in the vehicle design.

According to various embodiment variants, a second air flow path can be determined in such a way that the air flows from a vehicle environment to the evaporator, then to the heat exchanger and subsequently into a vehicle interior.

The second air path allows climate control, e.g. heating, of the vehicle interior. The vehicle interior can be, for example, a vehicle cabin for transporting people and/or for accommodating a vehicle driver. The comfort of the vehicle driver and/or of the passengers, for example, can be enhanced by climate control of the vehicle interior. Alternatively or in addition, the vehicle interior can also be a storage space in which a particular climate is desired. By using the air of the second air flow path, the climate of the storage space can be controlled in a manner which saves resources.

According to other embodiment variants, a third air flow path can be determined in such a way that the air flows from the vehicle environment to the evaporator and then into the vehicle interior without previously passing through the heat exchanger. In other words, the third air flow path leads directly from the evaporator into the vehicle interior.

It should be noted that the temperature control system can be designed solely to determine the first air flow path and the third air flow path. To this extent, the designation as "first, second or third air flow path" does not serve to describe a sequence but only to draw a distinction.

Via the third air flow path, it is possible to achieve interior cooling by directing some or all of the air which passes through the evaporator and is thereby cooled into the vehicle interior.

According to other embodiment variants, the first air flow path and/or the second air flow path can be determined in such a way that the air flows directly from the evaporator to the heat exchanger, in particular without previously passing through the vehicle interior.

It is thereby possible to achieve particularly targeted and easy to control climate control of the vehicle interior and temperature control of the drivetrain component(s).

According to other embodiment variants, the evaporator can be activatable and deactivatable. As an option, the cooling capacity of the evaporator can be subject to open-loop or closed-loop control.

This allows effective open-loop or closed-loop control of the air temperature, thus enabling the temperature of the temperature control medium and/or the climate control of the vehicle interior to be adapted more easily to specifications. The possibility of deactivating the evaporator can furthermore contribute to a reduction in the fuel or energy consumption of the motor vehicle.

According to other embodiment variants, a fan can be assigned to the heat exchanger.

The fan may be activatable and deactivatable. In the activated state, the fan can contribute to heat transfer at the heat exchanger, thus enabling the desired temperature control medium temperature to be set more easily. It may be possible to choose a smaller overall size for the heat exchanger when a fan is present.

Moreover, the temperature control system can be configured in such a way that only one of the three air flow paths is activatable at any one time. Alternatively, the temperature control system can be designed in such a way that only two of the three air flow paths, for example the first air flow path and the third air flow path, can be activated simultaneously. As a further alternative, the temperature control system can be designed in such a way that all three air flow paths can be activated simultaneously. In this case, the activation of the air flow paths can be accomplished by corresponding actuation of the flaps for determining the air flow paths, e.g. by opening, closing or partially opening or closing a flap for controlling the air flow.

Moreover, the temperature control system can have a control unit, which is connected in a signal-transmitting manner to the flaps for determining the air flow paths. The control unit can be configured to receive sensor signals from sensors, e.g. temperature sensors, to process these sensor signals in accordance with one or more routines on the basis of instructions or a code programmed into the control unit, and to transmit control signals to the flaps for determining the air flow paths as actuators in response to the processed sensor signals. The control unit can be implemented in hardware and/or software and can be physically in one or more parts. The control unit can be part of an engine control system or can be integrated into the latter.

A further aspect of the disclosure relates to a motor vehicle having a temperature control system in accordance with the above description. In particular, the motor vehicle can be fitted with a fuel cell drive.

A further aspect of the disclosure relates to a method for controlling the temperature of drivetrain components of a motor vehicle, which is fitted with one of the temperature control systems described above.

The method envisages that, when a temperature threshold value of the drivetrain component is exceeded, the first air flow path and/or the second air flow path are/is activated. For example, the first air flow path can be activated without the second air flow path being activated. It is also possible to activate only the first air flow path.

It should be noted that, in the case where a plurality of drivetrain components is cooled via the same temperature control circuit, the exceeding of the temperature threshold value by one of these drivetrain components can be sufficient to bring about activation of the first and/or second air flow path.

To determine the exceeding of the temperature threshold value, the temperature of the drivetrain component can be measured directly and compared with the temperature threshold value. Alternatively, the temperature of the drivetrain component can also be determined indirectly by, for example, measuring the temperature of the temperature control medium for cooling this drivetrain component. As a further alternative, the temperature of the drivetrain component can be estimated, e.g. being determined on the basis of a model. Such an estimate can be performed, for example, on the basis of influencing factors such as external temperature, engine load, time since the starting of the engine inter alia. The temperature threshold value is based on a non-zero, positive number.

The temperature threshold value can be chosen in such a way, for example, that, when the temperature threshold value is exceeded, an additional cooling demand of the drivetrain component is present that may not be covered via other cooling devices, e.g. a heat exchanger arranged in the region of the front of the vehicle.

Activating the first and/or second air flow path has the effect that the air flows from the vehicle environment to the evaporator and then to the heat exchanger. At the heat exchanger, thermal energy is transferred from the temperature control medium for cooling the drivetrain component to the air, with the result that the temperature of the temperature control medium falls and the drivetrain component can be cooled more effectively.

The evaporator can preferably be in an activated state or can be activated together with the first or second air flow path in order, via the evaporator, to be able to cool the air flowing into the temperature control system from the vehicle environment. It is thereby possible to bring about greater cooling of the temperature control medium at the heat exchanger and consequently greater cooling of the drivetrain component.

After passing through the heat exchanger, the heated air is discharged into the vehicle environment if the first air flow path is activated, whereas it is fed into the vehicle interior if the second air flow path is activated, leading to heating of the vehicle interior. Activating the first air flow path without activating the second air flow path has the advantage that the temperature in the vehicle interior does not increase, something that may be desired particularly at high ambient temperatures.

The activation of the first and/or second air flow path can be accomplished by actuating the element for determining flow paths of the air. For example, flaps of the temperature control system can be opened or closed in order to determine and activate the desired air flow paths. To actuate the flaps, corresponding control signals can be output to these actuators, said signals being produced by a control unit on the basis of the comparison of the temperature of the drivetrain component with the temperature threshold value.

The method can preferably be implemented by computer, i.e. at least one method step, preferably several or all the method steps, can be carried out using a computer program stored as instructions in memory of a controller (e.g., a computer/processor).

According to various embodiment variants, the method can envisage that, when there is a cooling demand in the vehicle interior, the third air flow path is activated, while second air flow path is deactivated.

This has the effect that, after passing through the evaporator, which can preferably be activated or is activated, the air is directed directly into the vehicle interior without previously passing through the heat exchanger. If there is only a cooling demand in the vehicle interior, however, the temperature threshold value of the drivetrain component is not exceeded, and therefore only the third air flow path can be activated, ensuring that all the air is directed into the vehicle interior after cooling at the evaporator. If, on the other hand, there is a cooling demand in the vehicle interior and, at the same time, the temperature threshold value of the drivetrain component is exceeded, the first and the third air flow path can be activated, with the result that some of the air cooled at the evaporator is directed into the vehicle interior, while the remaining air passes through the heat exchanger in order to cool the temperature control medium, before it is discharged into the vehicle environment. Consequently, both cooling of the vehicle interior and cooling of the drivetrain component(s) can be achieved.

Another aspect of the disclosure relates to a controller having memory with instructions stored thereon, the controller may signal commands which ensure that a temperature control system in accordance with the above description carries out a method for controlling the temperature of drivetrain components in accordance with the above description.

Instructions can be understood to mean a program code that can be stored on a suitable medium and/or can be retrieved by way of a suitable medium. Any medium suitable for storing software, e.g. a non-volatile memory installed in a control device, a DVD, a USB stick, a flash card or the like, can be used to store the program code. The program code can be retrieved via the internet or an intranet, for example, or via some other suitable wireless or wired network.

FIG. 1 shows a schematic diagram of an illustrative temperature control system 1. In the exemplary embodiment, the motor vehicle 100 of FIG. 8 is configured as a passenger car and is driven via an electric motor, which is supplied with electrical energy via a fuel cell. At the same time, the disclosure is not restricted either to passenger cars or to motor vehicles with a fuel cell drive.

FIG. 8 further illustrates an optional heat exchanger 102 arranged proximally to a front of the vehicle 100. The heat exchanger 102 may be a second heat exchanger and a heat exchanger 2 may be a first heat exchanger. The heat exchanger 2 is arranged adjacent to a downstream end of a front wheel well.

The temperature control system 1 has a heat exchanger 2, which is used to control the temperature of a temperature control medium. The temperature control medium flows in a temperature control circuit (not illustrated) for controlling the temperature of drivetrain components. Also arranged in the temperature control circuit, in the region of the front of the vehicle, is a further heat exchanger for heat transfer between the temperature control medium and the ambient air. In the exemplary embodiment, the drivetrain components are a fuel cell stack. The heat exchanger 2 is used to transfer heat from the temperature control medium to the air 4 flowing around the heat exchanger 2, said air being illustrated as a block arrow in FIGS. 1 to 7.

The temperature control system 1 furthermore includes an evaporator 3, which is arranged upstream of the heat exchanger 2 in relation to the flow direction of the air 4. The evaporator 3 is a component part of a climate control system or an air-conditioning system for conditioning the air 4.

Moreover, the temperature control system 1 comprises a first flap 5, a second flap 6, and a third flap 7 via determining flow paths 8, 9, 10 of the air. The first flap 5 may be interchangeably referred to herein as a first valve 5. The second flap 6 may be interchangeably referred to herein as a second valve 6. The third flap 7 may be interchangeably referred to herein as a third valve 7. The three flaps 5, 6, 7 are in effective signal connection with a control unit 13, illustrated in FIG. 1 by dashed lines. Via control signals, which are output by the control unit 13 to the three flaps 5, 6, 7, the position of the three flaps 5, 6, 7 can be varied between a fully closed position and a fully open position. In FIG. 1, the first flap 5 and the third flap 7 are illustrated in the fully closed position, while the second flap 6 is shown in the fully open position.

In one example, the three flaps 5, 6, 7 may be actuated to the fully closed position (e.g., 0% flow), the fully open position (e.g., 100% flow), or a position therebetween. The position therebetween may be described as more open, less open, more closed, or less closed.

The heat exchanger 2, the evaporator 3, and the three flaps 5, 6, 7 are arranged in a housing 14, the walls of which, depending on the position of the flaps 5, 6, 7, determine air flow paths 8, 9, 10, starting from the upstream vehicle environment 11, (e.g., atmosphere and/or outside air). As explained below with reference to FIGS. 2 to 7, air flow paths 8, 9, 10 extend from the upstream vehicle environment 11 into the downstream vehicle environment 11 and/or from the upstream vehicle environment 11 into the vehicle interior 12 can be determined. The first air flow path 8 extends from the upstream vehicle environment 11 to the evaporator 3, then to the heat exchanger 2 and subsequently into the downstream vehicle environment 11. The second air flow path 9 extends from the upstream vehicle environment 11 to the evaporator 3, then to the heat exchanger 2 and subsequently into the vehicle interior 12. The third air flow path 10 extends from the upstream vehicle environment 11 to the evaporator 3 and then into the vehicle interior 12 without previously passing through the heat exchanger 2.

The downstream vehicle environment 11 may include one or more drivetrain components 104 and a temperature sensor 106. The drivetrain components 104 may include an engine, an electric motor, a fuel cell, a gearbox, a differential, or other drivetrain component.

The first valve 5 is configured to control air flow from the evaporator 3 to the vehicle interior 12. In one example, the first valve 5 bypasses the heat exchanger 2 such that air flow directly from the evaporator 3 to the vehicle interior 12. The second valve 6 is configured to control air flow from the evaporator 3 to the heat exchanger 2. The third valve 7 is configured to control air flow to one or more of the vehicle interior 12 and the downstream vehicle environment 11.

FIGS. 2 to 7 show the temperature control system 1 of FIG. 1 in different operating modes, wherein the control unit 13 has not been illustrated for the sake of clarity. The table in FIG. 9 shows an overview of these operating modes. The positions of the first flap 5, the second flap 6 and the third flap 7 are indicated. Also indicated is whether the evaporator 3 is activated ("on") or deactivated ("off"). Moreover, the table contains information on the cooling of the air 4 to be fed to the vehicle interior 12 and on the additional fuel cell cooling, i.e. on the cooling effect which can be achieved via the proposed temperature control system 1 and which goes beyond the normal cooling via a heat exchanger at the front of the vehicle. In addition, the first through sixth operating modes are associated in the table with FIGS. 2 to 7. The asterisk indicates that additional cooling of the drivetrain component is not demanded but the result of the heat transfer from the drivetrain to the vehicle interior, normally at outside temperatures <20° C.

Figure 2:
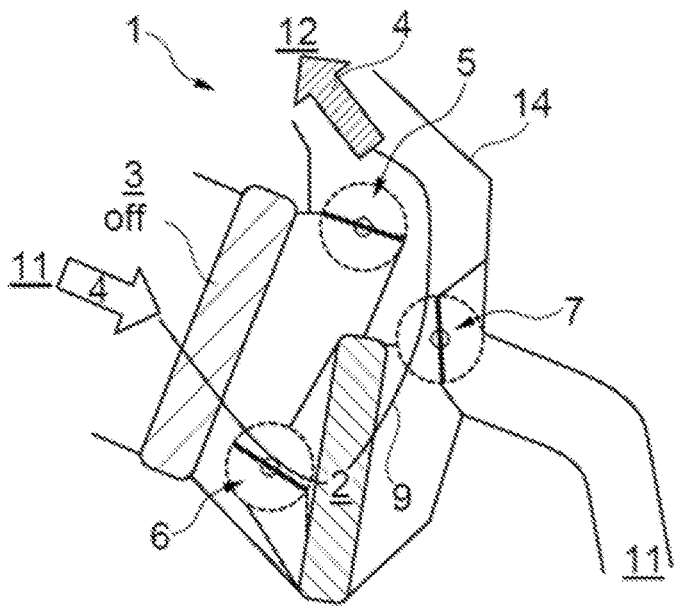
FIG. 2 illustrates the temperature control system in a first mode.

In FIG. 2, the temperature control system 1 is illustrated in a first operating mode. The first operating mode is used primarily to heat the vehicle interior 12, additional cooling of the fuel cells as a drivetrain component not being demanded or not being intended but being the result of heat transfer from the drivetrain to the vehicle interior, for example when outside temperatures are less than 20° C. In the first operating mode, the second air flow path 9 is activated, i.e. the air 4 flows from the vehicle environment 11 to the evaporator 3, then to the heat exchanger 2 and subsequently into the vehicle interior 12. Accordingly, the first flap 5 and the third flap 7 are closed, while the second flap 6 is open. The evaporator 3 is deactivated, i.e. the inflowing air 4 from the vehicle environment 11 is not climate-controlled via the evaporator 3, that is to say it is neither cooled nor dehumidified.

Since the air 4 flows around the heat exchanger 2, the temperature control medium flowing through the heat exchanger 2, which is used to cool the fuel cells, is cooled to a greater or lesser degree depending on the ambient temperature, while the temperature of the air 4 increases. The heated air, represented by a transversely hatched block arrow, then flows into the vehicle interior 12 and heats it. The first operating mode can be chosen, for example, at low ambient temperatures which, on the one hand, demand heating of the vehicle interior 12 and, on the other hand, render additional cooling of the fuel cells superfluous since these are already being adequately cooled via the heat exchanger arranged in the region of the front of the vehicle. Low ambient temperatures may include ambient temperatures less than a lower threshold ambient temperature. The lower threshold ambient temperature may be based on a non-zero number.

Figure 3:
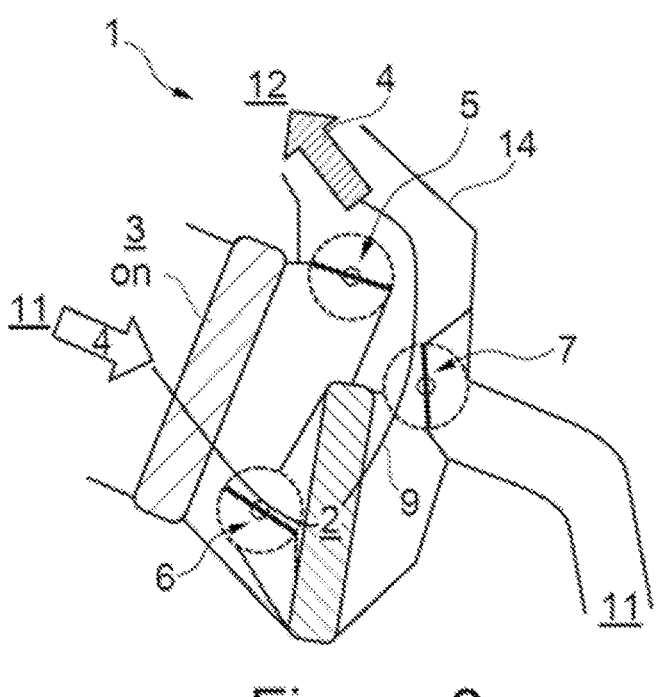
FIG. 3 illustrates the temperature control system in a second mode.

In FIG. 3, the temperature control system 1 is illustrated in a second operating mode. The second operating mode is used to heat and dehumidify the vehicle interior 12 by supplying air 4 with a low humidity. As in the first operating mode, additional cooling of the fuel cells as a drivetrain component is not demand or not intended, but the result of heat transfer from the drivetrain to the vehicle interior, normally at outside temperatures <20° C. The second operating mode differs from the first operating mode only in that the evaporator 3 is activated. This brings about dehumidification of the air 4. The cooling of the air 4 associated with dehumidification is overcompensated by the heat transfer from the temperature control medium to the air 4 via the heat exchanger 2, that is to say, as regards the air 4, the cooling capacity of the evaporator 3 is significantly lower than the heating capacity of the heat exchanger 2, with the result that, as in the first operating mode, heated air 4 flows into the vehicle interior 12, although this air is additionally dehumidified.

The second operating mode can be chosen, for example, at low ambient temperatures, e.g. outside temperatures around freezing point and less than the lower threshold ambient temperature, and high humidity which, on the one hand, demand heating and dehumidification of the vehicle interior 12 and, on the other hand, render additional cooling of the fuel cells superfluous since these are already being adequately cooled via the heat exchanger arranged in the region of the front of the vehicle. In one example, high humidity may be determined based on a humidity greater than an upper threshold humidity. The upper threshold humidity may be equal to a non-zero, positive number.

Figure 4:
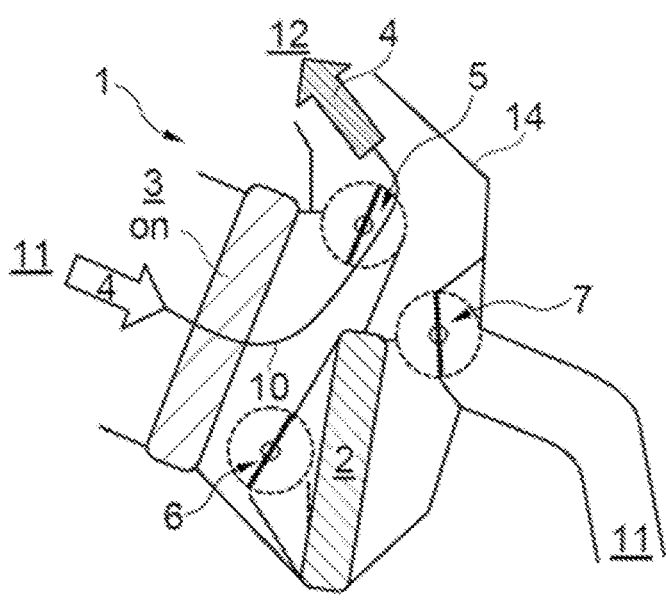
FIG. 4 illustrates the temperature control system in a third mode.

In FIG. 4, the temperature control system 1 is illustrated in a third operating mode. The third operating mode is used for cooling the vehicle interior 12, while additional cooling of the fuel cells is not achieved. In the third operating mode, the third air flow path 10 is activated, i.e. the air 4 flows from the vehicle environment 11 to the evaporator 3 and then into the vehicle interior 12 without previously passing through the heat exchanger 2. Accordingly, the second flap 6 and the third flap 7 are closed, while the first flap 5 is open. The evaporator 3 is activated and as such, the inflowing air 4 from the vehicle environment 11 is climate-controlled via the evaporator 3, that is to say it is cooled and possibly dehumidified. The cooled air 4, represented by a longitudinally hatched block arrow, is then directed into the vehicle interior 12 in order to cool the latter.

The third operating mode can be chosen, for example, at high ambient temperatures which, on the one hand, demand cooling of the vehicle interior 12. On the other hand, additional cooling of the fuel cells may be superfluous since, for example, these are already being adequately cooled via the heat exchanger arranged in the region of the front of the vehicle, or additional cooling is not yet demanded immediately after the starting of the vehicle. High ambient temperatures may be determined by comparing a current ambient temperature to an upper threshold ambient temperature, which is based on a non-zero, positive number. The upper threshold ambient temperature is greater than the lower threshold ambient temperature.

Figure 5:
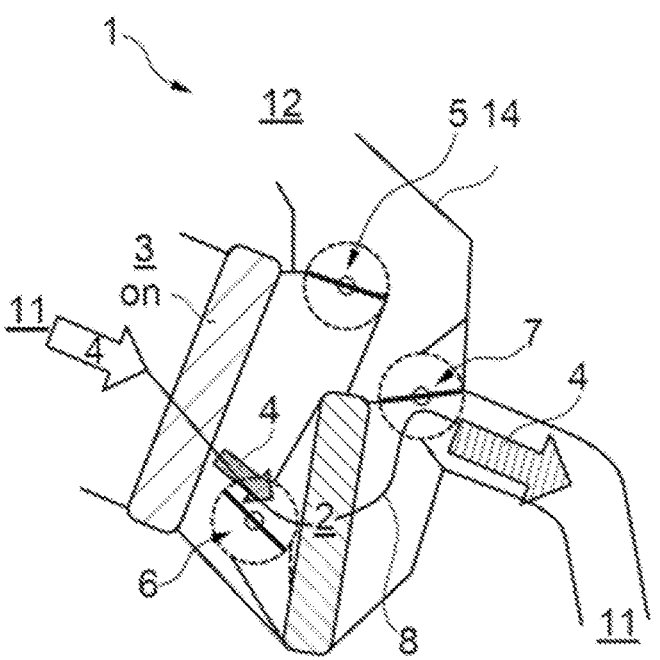
FIG. 5 illustrates the temperature control system in a fourth moth.

In FIG. 5, the temperature control system 1 is illustrated in the fourth operating mode. The fourth operating mode is used for additional cooling of the fuel cells, while cooling of the vehicle interior 12 is not achieved. In the fourth operating mode, the first air flow path 8 is activated and as such, the air 4 flows from the vehicle environment 11 to the evaporator 3, then to the heat exchanger 2 and subsequently into the vehicle environment 11. Accordingly, the first flap 5 is closed, while the second flap 6 and the third flap 7 are open. The evaporator 3 is activated, i.e. the inflowing air 4 from the vehicle environment 11 is climate-controlled via the evaporator 3, that is to say it is cooled and possibly dehumidified.

Since the cooled air 4 flows around the heat exchanger 2, the temperature control medium flowing through the heat exchanger 2, which is used to cool the fuel cells, is powerfully cooled, while the temperature of the air 4 increases. The heated air is then discharged into the vehicle environment 11. Unwanted heating of the vehicle interior 12 can thereby be reduced.

The fourth operating mode can be chosen, for example, at moderate ambient temperatures which, although they do not demand cooling of the vehicle interior 12, they do demand additional cooling of the fuel cells. It should be noted that the additional cooling demand of the fuel cells may also be due to other causes, e.g. the operation of the vehicle under a high load. The fourth operating mode can also be used when cooling resources are limited and do not simultaneously allow demanded cooling both of the vehicle interior 12 and of the fuel cells. In such a situation, it is possible to sacrifice cooling of the vehicle interior 12, at least for a short time, in favor of ensuring the main functionality of the motor vehicle 100.

Figure 6:
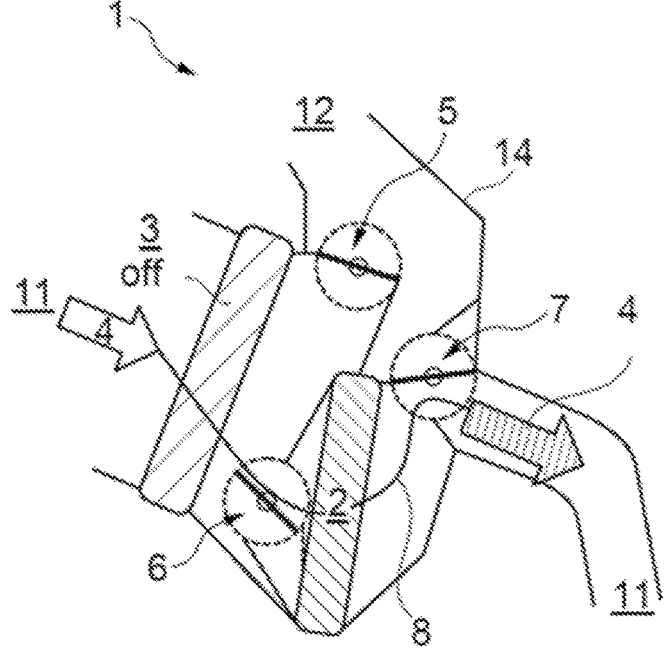
FIG. 6 illustrates the temperature control system in a fifth mode.

In FIG. 6, the temperature control system 1 is illustrated in the fifth operating mode. The fifth operating mode, like the fourth operating mode, is used primarily for additional cooling of the fuel cells, while cooling of the vehicle interior 12 is not achieved. In contrast to the fourth operating mode, the evaporator 3 is deactivated, and therefore the air 4 is not additionally cooled before it reaches the heat exchanger 2. Accordingly, the additional fuel cell cooling is of only medium intensity since the temperature difference between the temperature control medium and the air 4 at the heat exchanger 2 is less than in the fourth operating mode. In one example, the ambient temperature may be between the upper and lower threshold ambient temperatures during the fifth operating mode. Additionally or alternatively, vehicle interior 12 cooling not requested while a vehicle operating mode may be a mid-load (e.g., less than an upper load and greater than a lower load).

In FIG. 7, the temperature control system 1 is illustrated in the sixth operating mode. The sixth operating mode allows both cooling of the vehicle interior 12 and additional cooling of the fuel cells. The sixth operating mode represents a combination of the third and fourth operating modes. In the sixth operating mode, the first air flow path 8 and the third air flow path 10 are activated and as such, the air 4 flows from the vehicle environment 11 to the evaporator 3, then, on the one hand, to the heat exchanger 2 and subsequently into the vehicle environment 11 and, on the other hand, after the evaporator 3 directly into the vehicle interior 12. Accordingly, the first flap 5 and the second flap 6 are partially open, and the third flap 7 is fully open. The evaporator 3 is activated, i.e. the inflowing air 4 from the vehicle environment 11 is climate-controlled via the evaporator 3, that is to say it is cooled and possibly dehumidified. This results in cooling of the vehicle interior 12 and additional cooling of the fuel cells at a medium level.

The sixth operating mode can be chosen, for example, at high ambient temperatures, which demands both cooling of the vehicle interior 12 and additional cooling of the fuel cells.

In addition to the first and sixth operating modes shown and explained, further operating modes are possible, which allow appropriate combinations of cooling or heating of the vehicle interior 12 and cooling of the drive components. Additional operating modes can be obtained, inter alia, by partial opening and closure of the flaps 5, 6, 7 and activation or deactivation of the evaporator 3.

FIG. 8 shows a schematic diagram of an illustrative motor vehicle 100, which is designed as a passenger car with front-wheel drive. To control the temperature of drivetrain components, e.g. a fuel cell stack, a temperature control system 1 is provided, which is likewise arranged in the front region of the motor vehicle 1. The temperature control system 1 can be designed as described above with reference to FIGS. 1 to 7 and the table in FIG. 9 and can be capable of functioning in a corresponding manner.

As can be seen in FIG. 8, the discharge of air 4 into the vehicle environment 11 after passing through the heat exchanger 2 can be accomplished via a pipe 15, which runs to the underfloor region of the motor vehicle 100, thus enabling the air 4 to be discharged to the vehicle environment 11 in the underfloor region. This can have a positive effect on the aerodynamics of the motor vehicle 100 and hence the fuel or energy consumption thereof.

FIG. 10 shows a flowchart of an illustrative method 1000 for controlling the temperature of a drivetrain component of a motor vehicle 100. The method 1000 is carried out via the temperature control system 1 explained with reference to FIGS. 1 to 7 and 9. Instructions for carrying out method ### and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

After the method 1000 has started, the temperature TA of the drivetrain component is determined in method step S1. In the exemplary embodiment, this is performed on the basis of the temperature of the temperature control medium in the temperature control circuit for controlling the temperature of the drivetrain component.

In method step S2, the system checks whether the temperature TA is above a first temperature threshold value TS1. The first temperature threshold value TS1 is chosen so that, when the first temperature threshold value TS1 is exceeded, there is a slightly higher cooling requirement for the drivetrain component. If the temperature TA does not exceed the first temperature threshold value TS1, the method 200 returns to method step S1, i.e. the temperature TA of the drivetrain component is determined, e.g. continuously or periodically.

If, on the other hand, the temperature TA does exceed the first temperature threshold value TS1, the method 200 continues to method step S3. In method step S3, the system checks whether the temperature TA is above a second temperature threshold value TS2. The second temperature threshold value TS2 is chosen so that, when the second temperature threshold value TS2 is exceeded, there is a significantly higher cooling requirement for the drivetrain component, i.e. TS2>TS1. If the temperature TA does not exceed the second temperature threshold value TS2, the method 200 continues to method step S5. If, on the other hand, the temperature TA does exceed the second temperature threshold value TS2, the method 200 continues to method step S4.

In method step S4, the evaporator 3 of the temperature control system 1 is activated or, if it is already in an activated state, it is left in the activated state. The method 200 then continues to method step S6.

In method step S5, the evaporator 3 of the temperature control system 1 is deactivated or, if it is already in a deactivated state, it is left in the deactivated state. The method 200 then continues to method step S6.

In method step S6, the first air flow path 8 is activated. The method 200 then continues to method step S7.

In method step S7, the system checks whether there is a cooling requirement for the vehicle interior 12. For this purpose, the temperature of the vehicle interior 12 can be measured and compared with a temperature threshold value, for example. Alternatively, a cooling requirement demand can be interrogated, which can be made by a user of the motor vehicle 100 via a control element. If it is determined in method step S7 that there is a cooling requirement for the vehicle interior 12, the method continues with method step S8, and otherwise with method step S9.

In method step S8, the third air flow path 10 is activated in addition to the first air flow path 8 or, if it is already in an activated state, it is left in the activated state. The method 200 is then continued with method step S1.

In method step S9, the third air flow path 10 is deactivated or, if it is already in a deactivated state, it is left in the deactivated state. The method 200 is then continued with method step S1.

It should be noted that the flow chart in FIG. 10 is only a segment of a possible operating method for the temperature control system 1. Via additional temperature interrogations, it is possible, for example, to determine a heating requirement in the vehicle interior 12 which may lead to activation of the second air flow path.

The disclosure provides support for a temperature control system for a vehicle including a heat exchanger configured to transfer heat between a temperature control medium and air, an evaporator of a climate control system configured to condition the air, wherein the evaporator is arranged directly upstream of the heat exchanger relative, and a plurality of elements configured to control a flow path of the air, wherein a first flow path is configured to flow the air from a first environment to the evaporator, then directly to the heat exchanger prior to returning to the vehicle environment. A first example of the temperature control system further includes a second flow path configured to flow the air from the first environment to the evaporator, then directly to the heat exchanger prior to flowing into the vehicle interior. A second example of the temperature control system, optionally including the first example, further includes a third flow path configured to flow the air from the first environment to the evaporator prior to flowing into the vehicle interior. A third example of the temperature control system, optionally including one or more of the previous examples, further includes where the third air flow path includes not flowing the air through the heat exchanger. A fourth example of the temperature control system, optionally including one or more of the previous examples, further includes where there are no intervening components arranged between the evaporator and the heat exchanger. A fifth example of the temperature control system, optionally including one or more of the previous examples, further includes where the evaporator is configured to be activated or deactivated. A sixth example of the temperature control system, optionally including one or more of the previous examples, further includes where the vehicle is an electric vehicle.

The disclosure provides additional support for a system including an evaporator arranged directly upstream of a heat exchanger, a first valve configured to control air flow from the evaporator to a vehicle interior, a second valve configured to control air flow from the evaporator to the heat exchanger, a third valve configured to control air flow from the heat exchanger to the vehicle interior and to a vehicle environment, and a controller with instructions stored on memory thereof that when executed enable the controller to select one or more of a plurality of operating modes in response to a vehicle interior temperature request and a drivetrain component temperature. A first example of the system further includes where the instructions cause the controller to select a first mode in response to an ambient temperature being less than a lower threshold ambient temperature and the drivetrain component temperature being less than an upper threshold component temperature, the first mode comprising deactivating the evaporator, the first valve being fully closed, the second valve being fully open, and the third valve positioned to allow air flow from the heat exchanger to the vehicle interior while blocking air flow to the vehicle environment. A second example of the system, optionally including the first example, further includes where the instructions cause the controller to select a second mode in response to the ambient temperature being less than the lower threshold ambient temperature, the drivetrain component temperature being less than the upper threshold component temperature, and a humidity being greater than an upper threshold humidity, the second mode comprising activating the evaporator, the first valve being fully closed, the second valve being fully open, and the third valve positioned to allow air flow from the heat exchanger to the vehicle interior while blocking air flow to the vehicle environment. A third example of the system, optionally including one or more of the previous examples, further includes where the instructions cause the controller to select a third mode in response to an ambient temperature being greater than an upper threshold ambient temperature and a drivetrain component temperature being less than an upper threshold component temperature, the third mode comprising activating the evaporator, the first valve being fully open and the second valve being fully closed. A fourth example of the system, optionally including one or more of the previous examples, further includes where the instructions cause the controller to select a fourth mode in response to the drivetrain component temperature being greater than an upper threshold component temperature, the fourth mode comprising activating the evaporator, the first valve being fully closed, the second valve being fully open, and the third valve positioned to block air flow to the vehicle interior while flowing air to the vehicle environment. A fifth example of the system, optionally including one or more of the previous examples, further includes where the instructions cause the controller to select a fifth mode in response to the drivetrain component temperature being less than an upper threshold component temperature and greater than a lower threshold component temperature, the fifth mode comprising deactivating the evaporator, the first valve being fully closed, the second valve being fully open, and the third valve positioned to block air flow to the vehicle interior while flowing air to the vehicle environment. A sixth example of the system, optionally including one or more of the previous examples, further includes where the instructions cause the controller to select a sixth mode in response to the drivetrain component temperature being less than an upper threshold component temperature and greater than a lower threshold component temperature and a request for the vehicle interior to be cooled, the sixth mode comprising activating the evaporator, partially opening the first valve, partially opening the second valve, and the third valve positioned to block air flow to the vehicle interior while flowing air to the vehicle environment. A seventh example of the system, optionally including one or more of the previous examples, further includes where the heat exchanger is a second heat exchanger of a vehicle, wherein a first heat exchanger is positioned upstream of the second heat exchanger adjacent to a vehicle grill, and wherein the second heat exchanger is positioned in a portion of the vehicle in line with a downstream end of a front wheel well. An eighth example of the system, optionally including one or more of the previous examples, further includes where the vehicle environment is arranged downstream of a front wheel well.

The disclosure provides further support for a vehicle system including a heat exchanger arranged directly downstream of an evaporator, the heat exchanger and the evaporator are arranged near a front wheel well of the vehicle, and a controller with instructions stored on memory thereof that when executed enable the controller to select one or more of a plurality of operating modes in response to a vehicle interior temperature request and a drivetrain component temperature, wherein each of the plurality of operating modes is differentiated based on one or more of a position of at least one of a plurality of valves and an activation or a deactivation of the evaporator. A first example of the vehicle system further includes where a first valve is configured to control air flow directly from the evaporator to a vehicle interior. A second example of the vehicle system, optionally including the first example, further includes where a second valve is configured to control air flow directly from the evaporator to the heat exchanger, wherein the second valve is the only component between the evaporator and the heat exchanger. A third example of the vehicle system, optionally including one or more of the previous examples, further includes where a third valve is configured to control air flow directly from the heat exchanger to the vehicle interior and a vehicle environment.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example. It will be appreciated that one or more components referred to as being "substantially similar and/or identical" differ from one another according to manufacturing tolerances (e.g., within 1-5% deviation).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising an evaporator arranged directly upstream of a heat exchanger;
   a first valve configured to control air flow from the evaporator to a vehicle interior;
   a second valve configured to control air flow from the evaporator to the heat exchanger;
   a third valve configured to control air flow from the heat exchanger to the vehicle interior and to a vehicle environment; and
   a controller with instructions stored on memory thereof that when executed enable the controller to:
      select one or more of a plurality of operating modes in response to a vehicle interior temperature request and a drivetrain component temperature;
      wherein the instructions cause the controller to select a first mode in response to an ambient temperature being less than a lower threshold ambient temperature and the drivetrain component temperature being less than an upper threshold component temperature, the first mode comprising deactivating the evaporator, the first valve being fully closed, the second valve being fully open, and the third valve positioned to allow air flow from the heat exchanger to the vehicle interior while blocking air flow to the vehicle environment.

2. The system of claim 1, where the instructions cause the controller to select a second mode in response to the ambient temperature being less than the lower threshold ambient temperature, the drivetrain component temperature being less than the upper threshold component temperature, and a humidity being greater than an upper threshold humidity, the second mode comprising activating the evaporator, the first valve being fully closed, the second valve being fully open, and the third valve positioned to allow air flow from the heat exchanger to the vehicle interior while blocking air flow to the vehicle environment.

3. The system of claim 1, wherein the instructions cause the controller to select a third mode in response to an ambient temperature being greater than an upper threshold ambient temperature and a drivetrain component temperature being less than an upper threshold component temperature, the third mode comprising activating the evaporator, the first valve being fully open and the second valve being fully closed.

4. The system of claim 1, wherein the instructions cause the controller to select a fourth mode in response to the drivetrain component temperature being greater than an upper threshold component temperature, the fourth mode comprising activating the evaporator, the first valve being fully closed, the second valve being fully open, and the third valve positioned to block air flow to the vehicle interior while flowing air to the vehicle environment.

5. The system of claim 1, wherein the instructions cause the controller to select a fifth mode in response to the drivetrain component temperature being less than an upper threshold component temperature and greater than a lower threshold component temperature, the fifth mode comprising deactivating the evaporator, the first valve being fully closed, the second valve being fully open, and the third valve positioned to block air flow to the vehicle interior while flowing air to the vehicle environment.

6. The system of claim 1, wherein the instructions cause the controller to select a sixth mode in response to the drivetrain component temperature being less than an upper threshold component temperature and greater than a lower threshold component temperature and a request for the vehicle interior to be cooled, the sixth mode comprising activating the evaporator, partially opening the first valve, partially opening the second valve, and the third valve positioned to block air flow to the vehicle interior while flowing air to the vehicle environment.

7. The system of claim 1, wherein the heat exchanger is a second heat exchanger of a vehicle, wherein a first heat exchanger is positioned upstream of the second heat exchanger adjacent to a vehicle grill, and wherein the second heat exchanger is positioned in a portion of the vehicle in line with a downstream end of a front wheel well.

8. The system of claim 1, wherein the vehicle environment is arranged downstream of a front wheel well.

* * * * *